US006991354B2

(12) United States Patent
Brandenburg et al.

(10) Patent No.: US 6,991,354 B2

(45) Date of Patent: Jan. 31, 2006

(54) LIGHT-EMITTING DIODE MODULE FOR VEHICLE HEADLAMPS, AND A VEHICLE HEADLAMP

(75) Inventors: Wilhelm Brandenburg, Paderborn (DE); Oliver Hering, Niederstotzingen (DE); Thomas Reiners, Bachhagel (DE)

(73) Assignee: Patent-Treuhand-Gesellschaft fuer elektrische Gluehlampen mbH, Munich (DE)

(*) Notice: Subject to any disclaimer, the term of this patent is extended or adjusted under 35 U.S.C. 154(b) by 0 days.

(21) Appl. No.: 10/890,219

(22) Filed: Jul. 14, 2004

(65) Prior Publication Data

US 2005/0018429 A1 Jan. 27, 2005

(30) Foreign Application Priority Data

Jul. 24, 2003 (DE) ................................ 103 33 836

(51) Int. Cl.
*B60Q 1/04* (2006.01)

(52) U.S. Cl. ....................... 362/545; 362/539; 362/241

(58) Field of Classification Search ................ 362/237, 362/240, 241, 243, 245, 247, 539, 544, 545, 362/800

See application file for complete search history.

(56) References Cited

U.S. PATENT DOCUMENTS

| | | | | |
|---|---|---|---|---|
| 5,642,933 | A * | 7/1997 | Hitora | 362/243 |
| 5,769,532 | A * | 6/1998 | Sasaki | 362/237 |
| 6,565,247 | B2 * | 5/2003 | Thominet | 362/545 |
| 6,601,982 | B1 | 8/2003 | Begemann et al. | |
| 6,637,921 | B2 | 10/2003 | Coushaine | |
| 6,676,282 | B2 | 1/2004 | Begemann et al. | |
| 6,682,211 | B2 * | 1/2004 | English et al. | 362/545 |
| 2003/0043585 | A1 * | 3/2003 | Rohlfing et al. | 362/545 |
| 2003/0063474 | A1 | 4/2003 | Coushaine | |
| 2003/0067786 | A1 | 4/2003 | Begemann et al. | |

FOREIGN PATENT DOCUMENTS

| | | |
|---|---|---|
| EP | 1 298 382 | 4/2003 |
| WO | 01/01037 | 1/2001 |

* cited by examiner

*Primary Examiner*—Y. My Quach-Lee
(74) *Attorney, Agent, or Firm*—William E. Meyer

(57) ABSTRACT

The invention relates to a light-emitting diode module for a vehicle headlamp, which has a carrier for a number of light-emitting diodes and which carrier has a lateral surface of axially symmetrical design relative to a longitudinal axis, a number of light-emitting diodes being arranged on the lateral surface of the carrier, and the carrier being provided with at least one light directing means in order to direct in directions transverse to the longitudinal axis of the carrier the light emitted by the light-emitting diodes.

4 Claims, 1 Drawing Sheet

LIGHT-EMITTING DIODE MODULE FOR VEHICLE HEADLAMPS, AND A VEHICLE HEADLAMP

I. TECHNICAL FIELD

Figure 1:
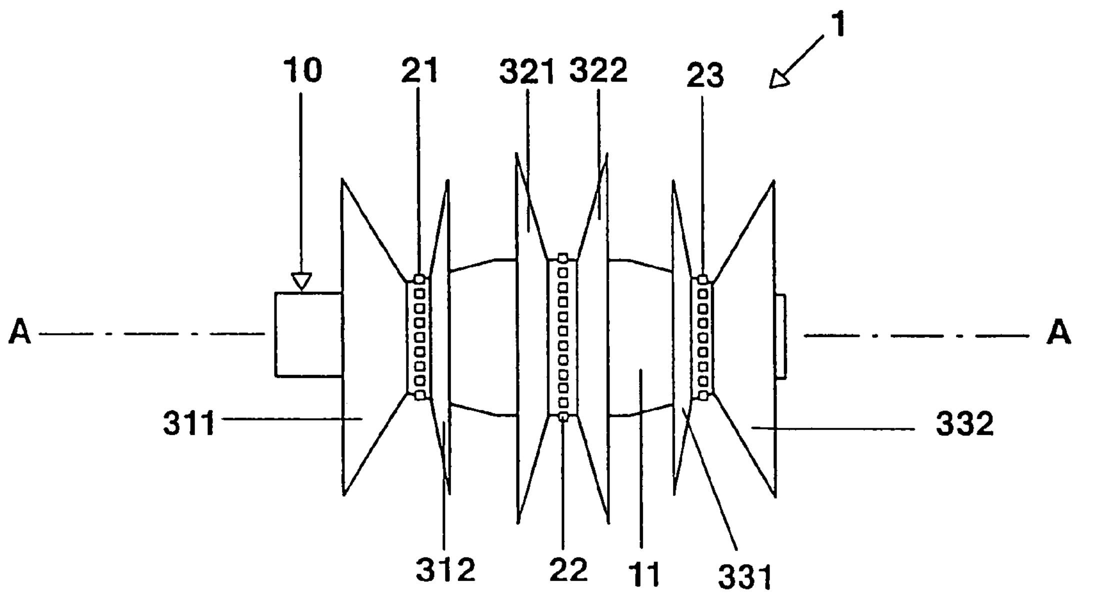

The invention relates to a light-emitting diode module for a vehicle headlamp, wherein the light-emitting diode module has a carrier for a number of light-emitting diodes, and to a vehicle headlamp.

II. BACKGROUND ART

The laid-open specification WO 01/01037 A1 discloses a vehicle headlamp with a multiplicity of light-emitting diodes serving as light source. The light bundle emitted by the light-emitting diodes has at least two segments with light from different spectral regions. A first segment of the light bundle has a high proportion of white or yellow-orange light, and a second segment has a high proportion of blue-green light.

The laid-open specification EP 1 298 382 A1 describes a light-emitting diode module for a vehicle luminaire having a reflector and a carrier for light-emitting diodes, the carrier having a plane surface on which the light-emitting diodes are arranged.

III. DISCLOSURE OF THE INVENTION

It is the object of the invention to provide a light-emitting diode module for a vehicle headlamp that is suitable for producing various light distributions typical of a vehicle headlamp. Moreover, it is the object of the invention to provide a vehicle headlamp that permits the production of the typical light distributions of a vehicle headlamp solely with the aid of light-emitting diodes as light sources.

This object is achieved by a light-emitting diode module for a vehicle headlamp, the light-emitting diode module having a carrier for a number of light-emitting diodes, wherein the carrier is provided with at least one light directing means in order to direct in prescribed spatial directions the light emitted by the light-emitting diodes. Particularly advantageous designs of the invention are described in the dependent patent claims.

The light-emitting diode module according to the invention has a carrier for a number of light-emitting diodes, the carrier being provided in accordance with the invention with at least one light directing means in order to direct in prescribed spatial directions the light emitted by the light-emitting diodes.

The light emitting diode module according to the invention permits optimum adaptation of the shape of the spatially extended light source, which consists here of a number of light-emitting diodes, to the reflector of the vehicle headlamp. It has emerged that the inventive light-emitting diode module in a vehicle headlamp can be used to produce different light distributions, in particular for dimmed headlight, high beam, fog lamp, parking light and daytime running light. The inventive light-emitting diode module serves in this case as light source in the vehicle headlamp and replaces the conventional halogen incandescent lamp or the high-pressure discharge lamp containing metal halides and xenon. The light-emitting diodes have a substantially longer service life than the above named lamps.

The carrier of the inventive light emitting diode module is preferably of axially symmetrical, in particular rotationally symmetrical design. It has a lateral surface of axially symmetrical design relative to a longitudinal axis on which a number of light-emitting diodes and the at least one light directing means are arranged, in order to direct in directions transverse to the longitudinal axis of the carrier the light emitted by the light-emitting diodes. The light-emitting diodes of the inventive light-emitting diode module are preferably arranged along at least one ring the axis of which runs parallel to the longitudinal axis of the carrier or on the longitudinal axis of the carrier. It is thereby possible to ensure optimum cooperation between the light-emitting diode module and the reflector of the vehicle headlamp.

In accordance with a preferred exemplary embodiment, the at least one light directing means is designed as a reflecting surface. The at least one light reflecting surface preferably faces the annularly arranged light-emitting diodes in order to focus their light in directions transverse to the longitudinal axis of the carrier. There are provided in accordance with a preferred exemplary embodiment two light reflecting surfaces that face the light-emitting diodes arranged along at least one ring in order to direct their light transverse to the longitudinal direction of the carrier on to the reflector of the vehicle headlamp. These light reflecting surfaces are preferably designed in such a way that they surround the carrier annularly in order to minimize the light losses.

However, the light directing means can also be designed as transparent refractor elements, for example as optical lenses, that are arranged in each case directly on the annularly arranged light-emitting diodes and focus light in directions transverse to the longitudinal axis of the carrier. However, it is also possible for the refractor element to be designed as an annular light guide that is fixed directly on the annularly arranged light-emitting diodes and whose lateral annular surfaces are designed to be totally reflecting and whose circumferential surface is transparent, in order to focus in directions transverse to the longitudinal axis of the carrier the light emitted by the light-emitting diodes.

The inventive vehicle headlamp has a light-emitting diode module that has a carrier for a number of light-emitting diodes, a reflector for reflecting the light emitted by the light-emitting diode module, and at least one optical lens for imaging the light reflected by the reflector. According to the invention, the carrier of the light-emitting diode module of the vehicle headlamp is provided with at least one light directing means in order to direct in prescribed spatial directions the light emitted by the light-emitting diodes.

The carrier preferably has a lateral surface of axially symmetrical design relative to an axis, a number of diodes and the at least one light directing means being arranged on the lateral surface in order to direct onto the reflector of the vehicle headlamp in directions transverse to the longitudinal axis of the carrier the light emitted by the light-emitting diodes.

The same light distributions as are produced with the aid of the conventional vehicle headlamps that are fitted with incandescent lamps or discharge lamps can be produced by means of the inventive vehicle headlamp, which contains exclusively light-emitting diodes as light source. In order to produce the largely mirror symmetric light distribution of the high beam, fog lamp, parking light and daytime running light, the inventive vehicle headlamp advantageously has at least one optical lens that projects onto the roadway the light emitted by the light-emitting diode module and reflected by the vehicle headlamp reflector. In addition, the inventive vehicle headlamp also has a shading device for producing the asymmetric light distribution of the dimmed headlight.

The light-emitting diodes mounted on the lateral surface of the carrier of the light-emitting diode module are preferably arranged along a number of rings running concentrically with the longitudinal axis of the carrier, in order to produce as high a luminous flux as possible and as high a luminous intensity as possible. The spacing between the above named rings is selected such that the light directing means do not cause any, or any appreciable shading of the light. For the same reason, and in order to ensure satisfactory imaging of the light-emitting diode module serving as light source by the reflector and the at least one optical lens of the vehicle headlamp, the dimensions of the carrier of the light-emitting diode module are as small as possible.

IV. BRIEF DESCRIPTION OF THE DRAWINGS

Figure 2:
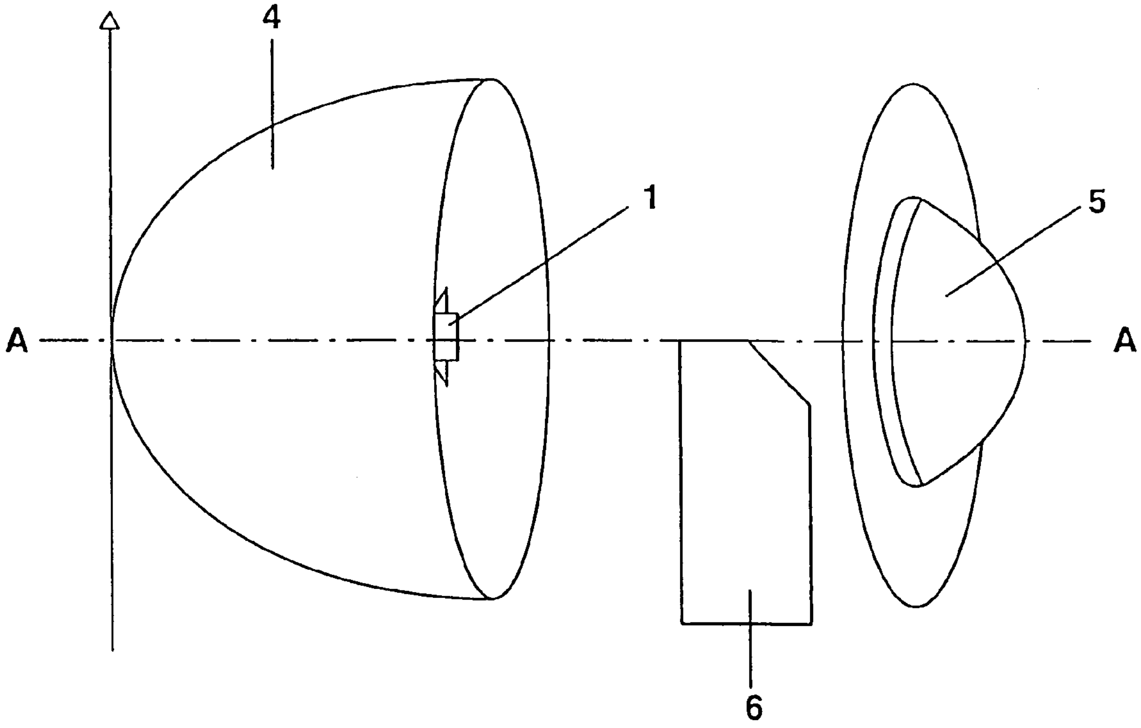

The invention will be explained in more detail below with the aid of a preferred exemplary embodiment. In the drawing:

FIG. 1 shows a side view of a light-emitting diode module in accordance with the preferred exemplary embodiment of the invention, and FIG. 2 shows a side view of a vehicle headlamp having the light-emitting diode module depicted in FIG. 1.

V. BEST MODE FOR CARRYING OUT THE INVENTION

The preferred exemplary embodiment of the inventive light-emitting diode module is illustrated schematically in FIG. 1. The light-emitting diode module 1 has an axially symmetric carrier 10 with a lateral surface 11 on which a total of sixty four light-emitting diodes are mounted. The carrier 10 is of rotationally symmetrical design relative to its longitudinal axis A-A. Of the above named sixty four light-emitting diodes, sixteen light-emitting diodes 21 are arranged equidistantly along a first ring of which the axis is identical to the longitudinal axis A-A of the carrier 10. Twenty four light-emitting diodes 22 and 23, respectively, are arranged equidistantly along a second and third ring of which the axis is likewise identical to the longitudinal axis A-A of the carrier 10. The spaces between the above named rings of light-emitting diodes 21, 22 and 23 are 9.9 mm in each case.

The total length of the carrier 10 is 30 mm, and its greatest outside diameter is 10 mm. Arranged in each case on both sides of each ring of light-emitting diodes 21, 22, 23 are two shields each having a light reflecting surface 311, 312, 321, 322, 331, 332 facing the light-emitting diodes 21, 22, 23. The light-emitting diodes 21, 22, 23 are therefore arranged between the respective pairs of light reflecting surfaces 311, 312; 321, 322; and 331, 332 forming in each case two adjacent screens for the respective diodes. The screens having the light reflecting surfaces 311, 312, 321, 322, 331, 332 are fixed on the lateral surface 11 of the carrier 10, annularly surround the carrier 10, and are inclined to the longitudinal axis A-A of the carrier 10 such that the interspace between the light reflecting surfaces 311, 312, 321, 322, 331, 332 in which the light-emitting diodes 21, 22, 23 are arranged, is of conical design. Consequently, the light emitted by the light-emitting diodes 21, 22, 23 is directed in directions transverse to the longitudinal axis A-A. The screens with the light reflecting surfaces 311, 312, 321, 322, 331, 332 in each case have an outside diameter of 20 mm. The carrier 10 is of hollow design. The electrical leads for the light-emitting diodes 21, 22, 23 run in the interior of the carrier 10.

Illustrated schematically in FIG. 2 is a side view of a vehicle headlamp having the light-emitting diode module 1 described above. This vehicle headlamp has a freeform surface reflector 4 of conical design with a structural depth of at least 65 mm. The light-emitting diode module 1 is arranged entirely in the freeform surface reflector 4 and is therefore not visible in FIG. 2. The longitudinal axis A-A of the light-emitting diode module 1 is identical to the optical axis A-A of the freeform surface reflector 4. The spacing between the first ring of light-emitting diodes 21 and the apex of the freeform surface reflector 4 is 9.81 mm. The spacing between the second and the third rings of light-emitting diodes 22 and 23, respectively, from the apex of the freeform surface reflector is correspondingly 19.7 mm and 28.6 mm. The vehicle headlamp further has an optical lens 5 arranged in front of the light exit opening of the freeform surface reflector 4 in order to project onto the roadway the light reflected by the freeform surface reflector 4. In order to produce the light/dark boundary of the dimmed headlight, an opaque diaphragm 6 is arranged between the optical lens 5 and the freeform surface reflector 4 at a spacing of 100 mm from the apex of the reflector 4.

What is claimed is:

1. A vehicle headlamp that has the following properties:

a light-emitting diode module that has a carrier extending along a longitudinal axis and supporting a number of light-emitting diodes, a reflector for reflecting the light emitted by said light-emitting diode module, at least one optical lens for imaging the light reflected by the reflector, wherein the carrier is provided with at least one light directing means in order to direct in prescribed spatial directions the light emitted by the light-emitting diodes wherein the vehicle headlamp has a shading device for producing a light/dark boundary in a resulting dimmed headlight beam.

2. The vehicle headlamp as claimed in claim 1, wherein the light-emitting diodes are arranged along at least one ring having an axis which runs parallel to the longitudinal axis of the carrier or on the longitudinal axis thereof.

3. A vehicle headlamp comprising:

a light-emitting diode module that has a carrier extending along a longitudinal axis and supporting a number of light-emitting diodes, a reflector for reflecting the light emitted by said light-emitting diode module, at least one optical lens for imaging the light reflected by the reflector;

wherein the carrier is provided with at least two light reflecting surfaces annularly surrounding the carrier to direct in prescribed spatial directions the light emitted by the light-emitting diodes;

wherein the light-emitting diodes are arranged along at least one ring the axis of which runs parallel to the longitudinal axis of the carrier; and wherein the light-emitting diodes arranged along the at least one ring are arranged between two light reflecting surfaces annularly surrounding the carrier.

4. A vehicle headlamp comprising:

a light-emitting diode module that has a carrier extending along a longitudinal axis and supporting a number of light-emitting diodes, a reflector for reflecting the light emitted by said light-emitting diode module, at least one optical lens for imaging the light reflected by the reflector, wherein the carrier is provided with at least two light reflecting surfaces annularly surrounding the carrier to direct in prescribed spatial directions the light emitted by the light-emitting diodes, wherein the carrier has a lateral surface of axially symmetrical design relative to the longitudinal axis, the light-emitting diodes and the at least one reflecting surface being arranged on said lateral surface of the carrier, and wherein the light-emitting diodes arranged along the lateral surface are arranged between two light reflecting surfaces annularly surrounding the carrier.

* * * * *